(12) United States Patent
Watanabe et al.

(10) Patent No.: US 7,843,120 B2
(45) Date of Patent: Nov. 30, 2010

(54) SCREEN STRUCTURE, DISPLAY PANEL AND ELECTRONIC EQUIPMENT USING THE SAME, AND METHOD OF MANUFACTURING THE SAME

(75) Inventors: Akemi Watanabe, Hiratsuka (JP); Osamu Takamatsu, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 12/269,392

(22) Filed: Nov. 12, 2008

(65) Prior Publication Data
US 2009/0128003 A1    May 21, 2009

(30) Foreign Application Priority Data
Nov. 15, 2007   (JP)  .............................. 2007-296577
Oct. 30, 2008   (JP)  .............................. 2008-279723

(51) Int. Cl.
*H01J 1/62*   (2006.01)
(52) U.S. Cl. .................. 313/496; 313/461; 313/112
(58) Field of Classification Search ............... 313/496, 313/461, 112
See application file for complete search history.

(56) References Cited
U.S. PATENT DOCUMENTS
6,181,062 B1*   1/2001   Hiraishi et al. .............. 313/504
6,747,405 B2*   6/2004   Hosokawa ................... 313/504
7,378,787 B2    5/2008   Lee et al.

FOREIGN PATENT DOCUMENTS
| | | |
|---|---|---|
| JP | 7-153386 | 6/1995 |
| JP | 2002-286906 | 10/2002 |
| JP | 2003-109523 | 4/2003 |
| JP | 2005-251725 | 9/2005 |
| JP | 2006-107738 | 4/2006 |

OTHER PUBLICATIONS

Partial Translation of Japanese Patent Application Laid-Open No. 2002-286906.

* cited by examiner

*Primary Examiner*—Karabi Guharay
(74) *Attorney, Agent, or Firm*—Fitzpatrick, Cella, Harper & Scinto (57) ABSTRACT

A screen structure has a transparent substrate and a color filter on the transparent substrate, and light from a source of luminescence transmits the color filter and the transparent substrate. The transparent substrate has a height difference specified by a refractive index of the transparent substrate, a refractive index of the color filter, and a wavelength of the light which transmits the color filter in an interface with the color filter.

14 Claims, 4 Drawing Sheets

SCREEN STRUCTURE, DISPLAY PANEL AND ELECTRONIC EQUIPMENT USING THE SAME, AND METHOD OF MANUFACTURING THE SAME

BACKGROUND OF THE INVENTION

1. Field of the Invention

The present invention relates to a screen structure, a display panel, and electronic equipment which are equipped with a color filter layer (color selection transmission layer), and a method of manufacturing the screen structure.

2. Description of the Related Art

A method of manufacturing a flat panel image display apparatus using an electron-emitting device and being equipped with a black matrix (light shielding layer), a color filter layer (selectively light-transmitting layer), and a phosphor layer is disclosed in Japanese Patent Application Laid-Open No. 2006-107738. In patent document 1, structure that a filter 2 and a phosphor 3 are stacked in this order on a transparent substrate 1 is disclosed.

In addition, structure of a cathode ray tube providing unevenness on a surface of a panel inner surface for the purpose of reduction of ambient light reflection is disclosed in Japanese Patent Application Laid-Open No. H07-153386.

Furthermore, structure and a method of manufacturing a flat panel display in which unevenness is formed under a phosphor and a black matrix for the purpose of improvement of adhesion of the phosphor and substrate are disclosed in Japanese Patent Application Laid-Open No. 2005-251725 using an electron-emitting device.

Moreover, an antireflection structure which provides unevenness in an interface between media whose refractive indices differ is disclosed in Japanese Patent Application Laid-Open No. 2002-286906.

In addition, structure of a glass substrate which uses a color filter as a buffer layer, which suppresses unevenness, on a surface of the glass substrate which has the unevenness in the Japanese Patent Laid-Open No. 2003-109523 is disclosed.

SUMMARY OF THE INVENTION

Figure 6:
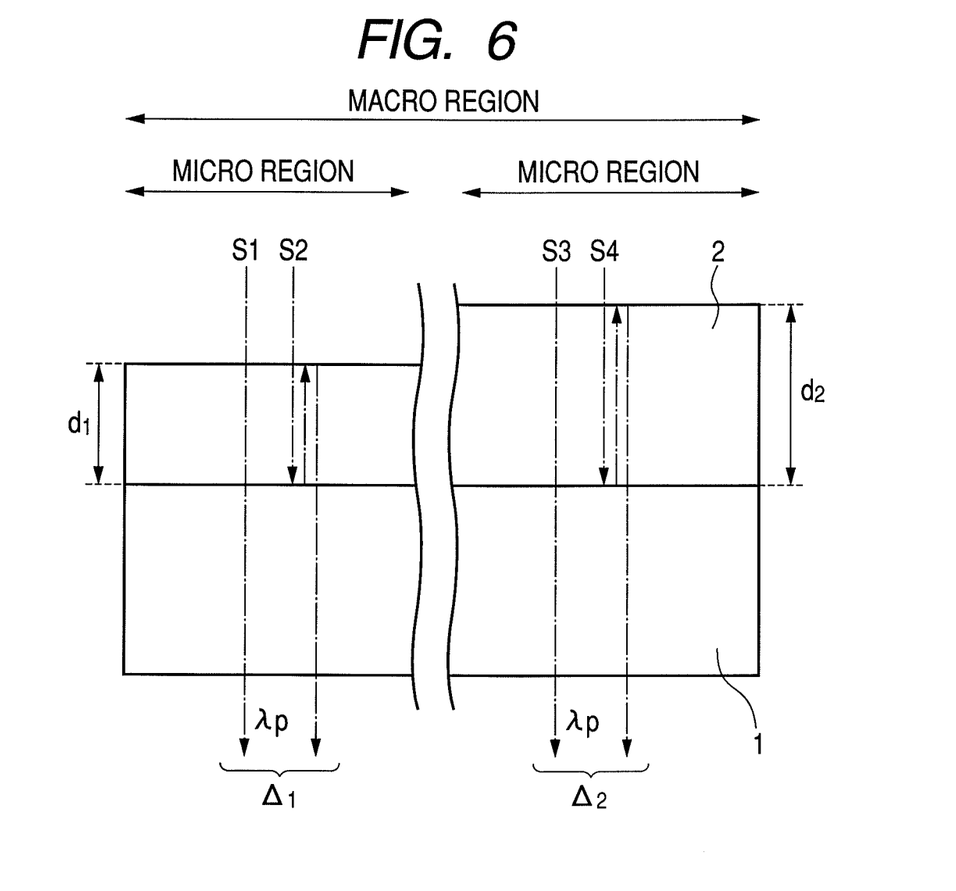
FIG. 6 is a schematic sectional view for describing a conventional screen structure.

In an image display apparatus described in the patent document 1, two surfaces of a color filter facing with each other are smooth. Therefore, as illustrated in FIG. 6, light which is emitted from the phosphor is reflected on a bottom face and a top face of the thin color filter layer, and interferes with light, which is directly transmitted, since a phase of the reflected light shifts. As it is generally said, optical interference by an optical path difference Δ is made strong or weak with each other in the case of the following relations (for simple consideration, angles of transmission and reflected light are set at 0°).

$$\Delta = 2DNcf = l\lambda p \quad \ldots \text{Strengthened mutually}$$

$$\Delta = 2DNcf = (l+\tfrac{1}{2})\lambda p \quad \ldots \text{Weakened mutually}$$

(where D denotes a film thickness of a color filter, Ncf does a refractive index of the color filter, l does a natural number including zero, and λp denotes a light-emitting wavelength of a phosphor).

In a case where top and bottom surfaces of a color filter are even (flat) as a conventional way, when it is seen from a certain one point of very narrow viewpoint (micro region), the film thickness of the color filter becomes uniform. However, on an entire display area (macro region), some regular or irregular distribution of the color filter film thickness exists. Therefore, an optical path difference varies in the display area, and a portion where light is strengthened mutually and a portion where light is weakened mutually exist. For that reason, it may seem that interference arises by the optical path difference of the transmitting light, for eyes of a human who is an observer. Thus, color strength differs according to a wavelength and color irregularity (color nonuniformity) may arise on the screen. In addition, since optical path lengths of transmitted and reflected light differ at angles of viewing the screen, various portions where coherent light is strengthened or weakened with each other may exist so that view angle dependence of color may arise. Such a problem becomes remarkable as a display area becomes larger.

The present invention aims at providing a display panel which improves display irregularity (display nonuniformity) and view angle dependence by suppressing optical interference by film thickness distribution in a display area of a color filter layer.

In order to solve the problem, a screen structure of the present first invention is a screen structure which has a transparent substrate and a color filter on the transparent substrate, wherein the color filter has a plurality of regions, and the substrate has a height difference with a value R expressed in the following Formula 1 in an interface with the color filter inside each of the regions:

$$R = (m+\tfrac{1}{2})\lambda p / |Ncf - Ng| \qquad \text{Formula 1}$$

(where, m denotes a natural number including zero, λp denotes a dominant wavelength of light, which transmits a color filter, Ncf denotes a refractive index of the color filter, and Ng denotes a refractive index of the transparent substrate).

In order to solve the problem, a screen structure of the present second invention is a screen structure which has a transparent substrate and a color filter on the transparent substrate, wherein the transparent substrate has unevenness in an interface with the color filter over almost an entire area where the transparent substrate forms the interface with the color filter, and a ten-point average roughness of the unevenness, with letting a reference length be 0.8 mm or less, is larger than a value Rz expressed by the following Formula 2:

$$Rz = \lambda p / 2|Ncf - Ng| \qquad \text{Formula 2}$$

where, λp denotes a dominant wavelength of light, which transmits the color filter, Ncf does a refractive index of the color filter, and Ng does a refractive index of the transparent substrate.

Display irregularity and view angle dependence are improved by applying the present invention.

Further features of the present invention will become apparent from the following description of exemplary embodiments (with reference to the attached drawings).

DESCRIPTION OF THE EMBODIMENTS

A screen structure of the present invention is a screen structure which has a transparent substrate and a color filter on the transparent substrate, and in which light from a source of luminescence transmits the color filter and the transparent substrate.

Then, the transparent substrate has a height difference of a value R, expressed by the following Formula 1, in an interface with the color filter.

$$R=(m+\tfrac{1}{2})\lambda p/|Ncf-Ng| \qquad \text{Formula 1}$$

(where, m denotes a natural number (hereafter, let a natural number include zero), λp denotes a dominant wavelength of light, which transmits a color filter, among wavelengths of light from the source of luminescence, Ncf denotes a refractive index of the color filter, and Ng denotes a refractive index of the transparent substrate).

It is preferable that the transparent substrate has unevenness in the interface with the color filter. Then, it is preferable that a ten-point average roughness of the unevenness is larger than a value Rz expressed by the following Formula 2.

$$Rz=\lambda p/2|Ncf-Ng| \qquad \text{Formula 2}$$

(where, λp denotes a dominant wavelength of light, which transmits a color filter, among wavelengths of light from the source of luminescence, Ncf denotes a refractive index of the color filter, and Ng denotes a refractive index of the transparent substrate).

It is further preferable that a ten-point average roughness is larger than a value Rz' expressed by the following Formula 3.

$$Rz'=\lambda p/|Ncf-Ng| \qquad \text{Formula 3}$$

In addition, a ten-point average roughness is Rz defined by Japanese Industrial Standards (JIS) BO601:1994.

The screen structure of the present invention is adoptable as a substrate (face plate) in the side of a display area which constructs a display panel of a liquid crystal display apparatus, a display panel of an electro luminescence display apparatus, a plasma display apparatus, or an electron ray display apparatus.

What can be mentioned as light from a source of luminescence are light of a back light which transmits a liquid crystal, light of a phosphor which is emitted by being excited with plasma, and light of a phosphor which is emitted by being excited with electron beam.

It is preferable to include a light shielding layer which has a plurality of apertures on the transparent substrate.

In addition, when it has two or more kinds of color filter in which dominant wavelengths of light to be transmitted differ, it is preferable to make it a maximum Rz among Rz obtained with parameters Ncf and λp of two or more kinds of color filters. Then, it is preferable to provide unevenness, which fulfills the above-mentioned Formula 2, in an interface of the transparent substrate with the color filter on the basis of the Rz.

Here, what can be used as a light shielding layer is, for example, a black member which is arranged in a striped form or a matrix form, and which is a so-called black stripe or black matrix. An aperture may be circular, elliptic, or rectangular. In addition, the aperture may be slit-like. In such a case, it can be also said that the light shielding layer includes a plurality of light shielding layers.

Furthermore, it is not necessary to provide the unevenness on the entire surface of the transparent substrate, and it is preferable to provide it in only an exposed part of the surface of the transparent substrate, the exposed part which is located inside of the aperture of the light shielding layer. In other words, it is preferable not to provide the unevenness in the interface of the transparent substrate with the light shielding layer. Thus, it is possible to suppress reflection of ambient light.

In addition, in the case of the color filter having a light shielding layer which has a plurality of apertures, it is preferable that the color filter is arranged inside of this aperture.

Furthermore, when the source of luminescence is a phosphor, this phosphor may be arranged on a substrate arranged oppositely to the transparent substrate like a display panel of a plasma display apparatus. Moreover, it may be arranged on a transparent substrate like a display panel of an electron ray display apparatus, such as a field emission display.

When a phosphor is arranged on a transparent substrate like a display panel of an electron ray display apparatus, it is preferable that the phosphor is arranged on a color filter.

In addition, in the case of a display panel of an electron ray display apparatus, it is preferable that a phosphor is arranged inside of the aperture of the light shielding layer.

The screen structure described above is arranged oppositely to the substrate on which the source of luminescence is arranged, and can construct a display panel like a display panel of a liquid crystal display apparatus or a plasma display apparatus.

Alternatively, the screen structure described above is placed oppositely to the substrate on which an electron-emitting device is arranged like a display panel of an electron ray display apparatus, and can construct a display panel.

The above-described display panel can be mounted on electronic equipment, such as a TV set, an image display apparatus for a personal computer, a portable personal computer, or a cellular phone.

Figure 1:
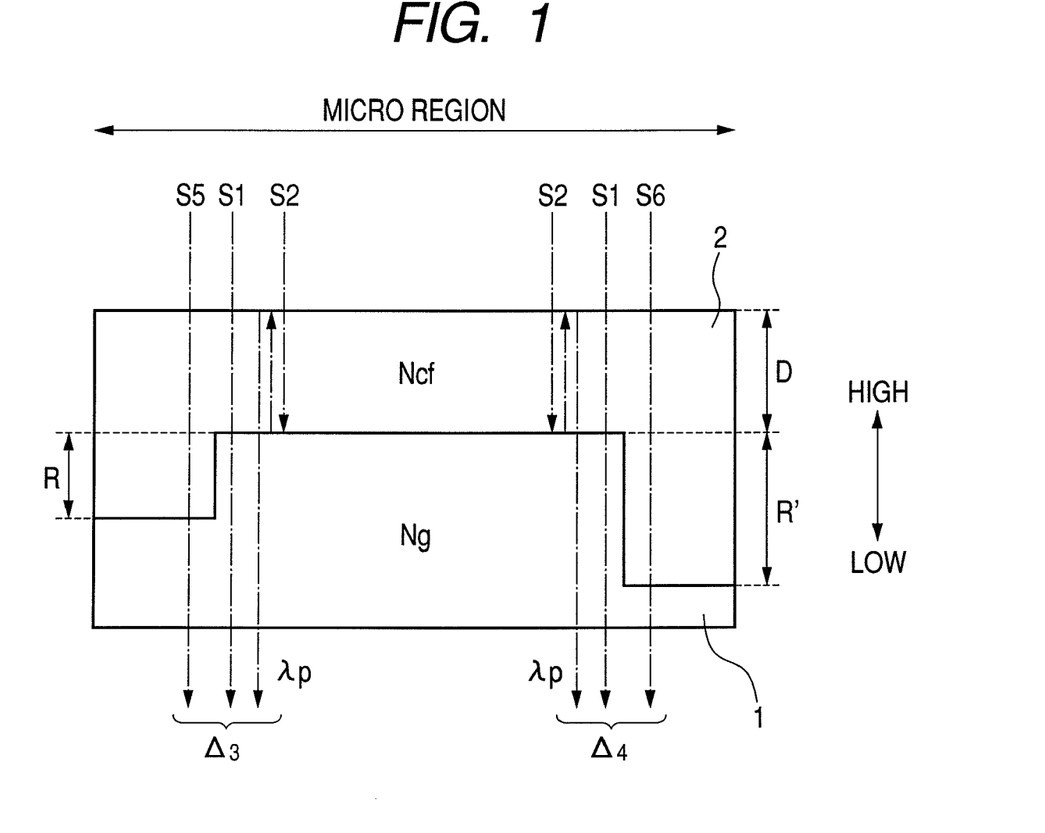
FIG. 1 is a schematic sectional view for describing a principle of a screen structure which illustrates an embodiment of the present invention.

FIG. 1 is a schematic sectional view for describing a principle of a screen structure illustrating an embodiment of the present invention.

The screen structure illustrated in FIG. 1 includes a transparent substrate 1 and a color filter 2 on the transparent substrate 1.

A plastic substrate and a glass substrate can be used as the transparent substrate 1. As a glass substrate, it is preferable in respect of having stability in a thermal process to use high strain glass, such as PD-200 (made by Asahi Glass Co., Ltd.) and PP-8 (made by Nippon Electric Glass Co., Ltd.). The transparent substrate is a substrate optically transparent to visible light.

The color filter 2 is a film including fine particles which are made of an inorganic pigment or metallic colloid, and it is preferable to have characteristics of transmitting red, green, or blue of visible light. As materials of the fine particles, for example, cobalt oxide, manganese oxide, ferric oxide, and the like are mentioned. As for particle diameters of the fine particles, it is preferable to be smaller than a value of ten-point average roughness of the unevenness. The color filter 2 can be formed by an ink jet method, a photolithography method, a screen printing, or the like. A film thickness of the color filter 2 is determined according to transmission property of each material thereof, and specifically, hundreds of nm to several μm of thickness is preferable in consideration of effect to luminance and contrast.

The screen structure of the present invention is provided with a portion, which becomes a height difference R, on a surface of the transparent substrate 1 which is an interface (hereafter, this interface is referred to when just calling it an interface) between the transparent substrate 1 and color filter 2. The height difference R will be detailed later.

The "surface of the transparent substrate 1" is a surface forming an interface with the color filter 2 between two opposing surfaces of the transparent substrate 1. The "surface of the color filter 2" is a surface which is not a surface which forms an interface with the transparent substrate 1 between two opposing surfaces of the color filter 2. In other words, the "surface of the color filter 2" is a surface opposite to a surface near the transparent substrate 1 between two opposing surfaces of the color filter 2.

In order to define a film thickness in a micro region (will be mentioned later), a "film thickness D of the color filter 2" is defined as a distance from a highest position of the surface of the transparent substrate 1 in a micro region to the surface of the color filter 2.

On the other hand, an "actual film thickness" is defined as a distance from an arbitrary point of an interface to the surface of the color filter 2. For example, a distance from a low portion of the surface of the transparent substrate 1, which forms the height difference R to the highest portion of the surface of the transparent substrate 2, to the surface of the color filter 2 is the "actual film thickness", and is expressed in D+R.

Then, a refractive index of the transparent substrate 1 is Ng and a refractive index of the color filter 2 is Ncf.

Hereinafter, when describing the "height difference", "film thickness", "unevenness", "high portion", and "low portion", it will be described that a direction which is a direction vertical to a surface opposite to the surface, which forms the interface with the color filter, between two opposing surfaces of the transparent substrate 1, and which orients to the color filter 2 from the transparent substrate 1 is upper. For example, the "high portion" ("high portion" may be convex) denotes a portion that the surface of the transparent substrate 1 protrudes toward the color filter 2, against the "low portion" ("low portion" may be concave). In addition, the direction here is a convenient expression for making description simple, and does not limit a direction of the screen structure itself. In addition, for simple consideration, light in a direction vertical to a surface opposite to a surface, which forms an interface with the color filter 2, between two opposing surfaces of the transparent substrate 1 will be discussed as transmitted and reflected light.

FIG. 6 illustrates a schematic diagram in the case of providing the color filter 2 on the transparent substrate 1 having an even (flat) surface. In FIG. 6, a region (region in a right-hand side in FIG. 6) in which a film thickness of the color filter 2 is formed thickly, and a region (region in a left-hand side in FIG. 6) in which a film thickness of the color filter 2 is formed thinly are extracted, are illustrated schematically. In addition, optical paths of light which transmits the color filter 2 are illustrated by arrows. Actually, although optical paths S1 and S2 and the optical paths S3 and S4 transmit and are reflected on the same portions respectively, they are separately illustrated in order to distinguish them on the drawing. Light which passes the optical paths (S1 and S3) illustrated in FIG. 6 is stronger than light which passes through the optical paths (S2 and S4). The light which passes through the optical paths (S1 and S3) is light permeating the interface between the transparent substrate 1 and color filter 2 without being reflected. The light which passes through the optical paths (S2 and S4) is light which is reflected by the interface after entering into the color filter, and transmits the interface after being further reflected on a surface of the color filter. Brightness (intensity) of the light which passes through these optical paths (S1, S2, S3, S4) is at least dependent on transmittances (reflectances) at the interface and surface of the color filter 2. Then, conditions on which the light which passes through the S1 (S3), and the light which passes through the S2 (S4) interfere are expressed as follows on the basis of the Formula (Δ=2DNcf), in which the optical path difference is expressed:

$$\Delta_1 = 2d_1 Ncf = l_1' \lambda p \quad \text{Formula (A)}$$

$$\Delta_2 = 2d_2 Ncf = (l_2' + \tfrac{1}{2}) \lambda p \quad \text{Formula (B)}$$

Here, $d_1$ and $d_2$ denote film thickness of the color filter 2, $l_1'$ denotes a natural number except zero, $l_2'$ denotes a natural number, and $\lambda p$ denotes a dominant wavelength of light which transmits the color filter 2. Hence, when a color filter is provided on an even transparent substrate, the interference is determined by a film thickness and a refractive index of the color filter 2 from the Formulas (A) and (B). When a region where the film thickness D of the color filter 2 becomes $d_1$, and the region where it becomes $d_2$ exist in the display area of the transparent substrate, and when D=$d_1$ fulfills the Formula (A), the transmitted lights of the region strengthen each other, or when D=$d_2$ fulfills the Formula (B), the transmitted lights of the region weaken each other. When the film thickness D has the distribution as described above in the display area (macro region) of the transparent substrate, a region where light is strong, and a region where light is weak arise in the macro region, which are observed as irregularity of brightness. In the case of full color display, when intensity of transmitted light changes with a film thickness of the color filter 2, a specific wavelength becomes strong or becomes weak, a hue shifts, and an irregular color arises.

In order to reduce such irregularity, what is necessary is just to provide a portion, where transmitted light is strengthened mutually, and a portion, where it is weakened mutually, in a region (this is called a micro region) which is a region narrower than the macro region and which can be regarded as a surface of the color filter 2 being smooth. Then, such micro regions are provided over an almost entire region of the macro region. A micro region, which is a region narrower than the macro region, means each of a plurality of regions obtained by dividing the entire region which has the color filter. When a screen structure comprises a plurality (large number) of sub pixels, the micro region can be regarded as one sub pixel typically. In the case of a full color screen structure, the sub pixel refers to a region which comprises a color filter which assumes any color of red, blue, and green colors, and which is surrounded by a black member. The screen structure of the present invention has a height difference in an interface between the transparent substrate 1 and color filter 2. That is, the full color screen structure has typically a height difference in the interface between the transparent substrate 1 and color filter 2 which are located in each sub pixel. A schematic diagram for describing a principle of the present invention is illustrated in FIG. 1. In FIG. 1, optical paths of light are expressed by arrows.

In a micro region, when the interface between the transparent substrate 1 and color filter 2 has a height difference, the following interference may arise. Light (light which passes through the optical path S5) which transmits a low portion of the interface between the transparent substrate 1 and color filter 2, and light (light which passes through the optical path S1) which transmits a high portion of the interfere. Hence, what is necessary is just to provide a height difference so that this coherent light may become weak. Optical path difference Δ of coherent light (light which passes through the optical path S1, and light which passes through the optical path S5) in the case where there is the height difference R is $\Delta=|(D+R)Ncf-(DNcf+RNg)|=|Ncf-Ng|\times R$.

Here, Ng denotes a refractive index of the transparent substrate 1, D denotes a film thickness of the color filter 2 and a thickness from a highest portion of the transparent substrate 1 to a surface of the color filter 2, Ncf denotes a refractive index of the color filter 2, and R denotes a height difference of a location of the interface where light transmits.

In order to make coherent light (light which passes through the optical path S1, and light which passes through the optical path S5) weak, what is necessary is just to let an optical path difference be a half wave length. Hence, let $R=R_3$ hold, and a condition of an optical path difference $\Delta_3$ by which interference arises with a phase shifting by a half wave length is expressed as follows:

$$\Delta_3=|Ncf-Ng|\times R_3=(m+\tfrac{1}{2})\lambda p \quad \text{Formula (C)}$$

Here, m is a natural number. Hence, the height difference provided in a micro region may have just the following value R. That is, it can be expressed as follows:

$$R=(m+\tfrac{1}{2})\lambda p/|Ncf-Ng| \quad \text{Formula (D)}$$

Thereby, in a micro region where the film thickness D fulfills Formula (A), a phase of the light (light which passes through the optical path S5) which transmits a low portion shifts by a half wave length to the coherent light (light which passes through the optical path S1, and light which passes through the optical path S2) which transmits a high portion and whose phase is aligned. For that reason, since coherent light which is weakened with each other can be obtained, brightness of transmitted light drops. Although not illustrated in FIG. 1, in the case of providing the height difference R in the micro region in FIG. 6 where the film thickness D fulfills Formula (B), a phase of the light (light which passes through the optical path S5) which transmits a low portion further shifts by a half wave length with respect to the coherent lights (light which passes through the optical path S3, and light which passes through the optical path S4) which transmits a high portion and whose phases shift by a half wave length. For that reason, since the coherent light that both the light (light which passes through the optical path S4, and light which passes through the optical path S5) whose phases are aligned strengthens each other is obtained, brightness of transmitted light is improved. Hence, in the macro region, not depending on the film thickness D, more uniform brightness can be obtained. Although the case where the film thickness D fulfills Formula (A) or Formula (B) is described here, also in the case of the other, a phase of light which transmits a low portion shifts by a half wave length to light which transmits a high portion.

In addition, although not illustrated in FIG. 1, the optical path difference between light which transmits a low portion and light which is reflected in a high portion and transmits a low portion is expressed as follows:

$$\Delta_3'=(2D+R)Ncf-RNg=2DNcf+R\times|Ncf-Ng|$$

Since a portion of this $R\times|Ncf-Ng|$ becomes $(m+\tfrac{1}{2})\lambda p$, coherent light whose phase shifts by a half wave length can be obtained in a micro region.

Thus, when both the lights which transmit the high portion and a low portion whose height difference is R interfere in a micro region, it is understood that the optical path difference Δ is dependent at least on $R\times|Ncf-Ng|$, and coherent light in which phases of those light shift by a half wave length can be obtained.

As stated above, it turns out that the irregularity (nonuniformity) of brightness due to the distribution of the film thickness D can be improved, by performing construction so that the interface between the transparent substrate 1 and color filter may have a height difference defined by the Formula (D).

In addition, as illustrated in FIG. 1, a condition of an optical path difference on which light (light which passes along the optical path S1) which transmits a high portion, and light (light which passes through the optical path S6) which transmits a low portion become in phase is expressed as follows:

$$\Delta_4=|Ncf-Ng|\times R_4=m'\lambda p \quad \text{Formula (E)}$$

where, m' is a natural number except zero. Hence, when a height difference R' provided in a micro region is provided as expressed in the following Formula (F), phases of light which transmits a high portion, and light which transmits a low portion are aligned and brightness is increased:

$$R'=m'\lambda p/|Ncf-Ng| \quad \text{Formula (F)}$$

Generally, production process of providing the height difference R expressed in the Formula (D) in a transparent substrate so as to be accurately controlled becomes complicated.

Hence, it is preferable to provide the unevenness whose height varies continuously so that such a height difference may arise in a micro region. When being continuous, the height difference which fulfills Formula (D) is obtained, and at the same time the height difference which generates coherent light whose phase difference becomes other than a half wave length can be obtained. The unevenness whose height varies continuously may be periodic unevenness, or may be random unevenness. The unevenness consists of a plurality of high portions (convexes) and/or low portions (concaves). In particular, since formation of a height difference can be realized more simply, it is preferable to provide the random unevenness.

Specifically, it is preferable to make ten-point average roughness of the unevenness a value R or more with m=0 among the value R expressed by Formula (D). That is, ten-point average roughness Rz of the unevenness is made as follows:

$$Rz \geq \lambda p/2|Ncf-Ng| \quad (G)$$

Figure 2:
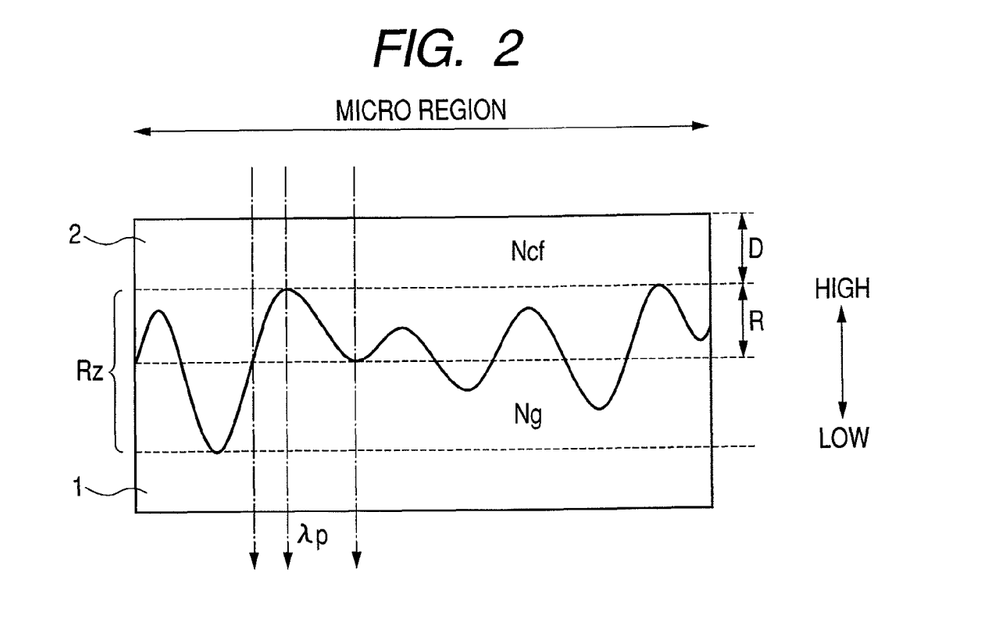
FIG. 2 is a schematic sectional view of the screen structure which has random unevenness illustrated in a first example of the present invention.

FIG. 2 illustrates a schematic sectional view of an example provided with unevenness, whose height varies continuously, and which is random. When the ten-point average roughness Rz of the unevenness whose height changes continuously fulfills Formula (G), a portion where the height difference R becomes a value with of m=0 in Formula (D) always exists within the region. In addition, a phase difference of light which can interfere becomes random in the range of being larger than a half wave length.

Here, the ten-point average roughness called herein is "ten-point average roughness" defined by Japanese Industrial Standards (JIS) B0601:1994. This samples a reference length L in a direction of a mean line from a roughness curve. Then, an average value of absolute height values of the high portion, from a highest portion to a fifth highest portion, from a mean line of this sampled portion is determined. And, an average value of absolute height values of the low portion, from a lowest portion to a fifth lowest portion, from the mean line of this sampled portion is determined. Sum of such average values is determined and what this value is expressed in μm is the ten-point average roughness.

It can be considered that the reference length L in a direction parallel to the transparent substrate 1 for measuring the ten-point average roughness of unevenness is a width of a micro region where the surface of the color filter 2 is smooth. Although the reference length L can be suitably selected according to an area or a degree of a film thickness distribution of a display area which is a macro region, it is preferable that the reference length L is smaller than size of the macro region. Specifically, it is preferable that reference length L is 0.8 mm or less from the specification of JIS B0601:1994. That is, when 0.8 mm or less of reference length L is taken, there are five points of high portions and five points of low portions, and the ten-point average roughness fulfills the Formula (G), the present invention holds. In the case of the ten-point average roughness in 0.8 mm or less of reference length, it becomes extremely difficult to identify irregularity of interference in a micro region with a resolution of a human's eye.

As mentioned later using FIG. 3, when classifying a display region so as to have a plurality of pixels (sub pixels), it is conceivable that a surface of the color filter 2 in one pixel region is smooth. Here, one pixel region is a region where an interface between the transparent substrate 1 and color filter 2 exists continuously. Hence, it is desirable to regard one pixel region to be a micro region, and to make the reference length L of the ten-point average roughness a width of one pixel region or less. In particular, it is preferable to use a width in a longitudinal direction, and to take the reference length L so as to pass a center portion of the pixel region. When the longitudinal direction of one pixel region is set at the reference length L, the ten-point average roughness of a surface of the color filter 2 in this reference length L may become larger than the ten-point average roughness of unevenness of an interface. In that case, it is preferable to select such a reference length L' that the ten-point average roughness of the surface of the color filter 2 may become smaller than the ten-point average roughness of unevenness of the interface, and to provide in one pixel region such unevenness as fulfills Formula (G) with this reference length L'. Naturally, it is necessary to provide the unevenness in an almost entire area of the screen structure, that is, over almost all sub pixels. The "almost all sub pixels" means not less than 80% of all sub pixels, and it is further preferable that sub pixels located in a center portion are included in this "80%".

When the color filter 2 is formed on the transparent substrate 1, which has a height difference, by a method of using a liquid material, such as the ink jet method, photolithography method, or screen printing described above, roughness of a surface of the color filter 2 becomes small to roughness of the interface. It can be also said that the present invention decreases display irregularity, resulting from a distribution of the film thickness D of a color filter within a display area which is a macro region, by giving the distribution to a micro region smaller than an image display area, for example, an actual film thickness of the color filter within one pixel region. Since an actual film thickness of the color filter disperses in $\lambda p/2|Ncf-Ng|$ or more in a micro region and a portion which fulfills the Formulas (A) and (B) arises in the micro region, display irregularity can be reduced.

In addition, it is further preferable to make the ten-point average roughness Rz of unevenness a value R' or more with m'=1 among the value R' expressed in Formula (F) as follows:

$$Rz \geq \lambda p/|Ncf-Ng| \quad \text{Formula (H)}$$

Since an optical path difference of light which can interfere become random in the range of 0 to 1 wavelength when doing it in this way, while reducing irregularity of brightness in the macro region, degradation of the brightness can be suppressed. Since it has many height differences obtained by making values of the Formulas (D) and (F) m and m' which are a plurality of values when the ten-point average roughness of unevenness is increased, irregularity can be reduced in higher accuracy.

In a screen structure, in order to make it perform full color display, two or more kinds of color filters whose dominant wavelengths of light to transmit differ are arranged in a two-dimensional matrix. In the case of two or more kinds of dominant wavelengths of transmitted light, when intensity of the transmitted light changes with a film thickness of the color filter 2, a specific wavelength becomes strong or becomes weak, a hue shifts, and an irregular color arises.

Then, it is necessary that the screen structure has a height difference that a dominant wavelength $\lambda p$ of light which transmits several kinds of color filters 2 and the refractive index Ncf fulfills the value R expressed by the Formula (D).

For that purpose, as mentioned above, it is necessary to provide unevenness so that $\lambda p$ and Ncf of each kind of color filter 2 may fulfill the Formula (G). On the other hand, it may complicate production process to make the ten-point average roughness of unevenness on the interface between the transparent substrate 1 and each color filter 2 different for every color filter. Then, it is preferable to make the ten-point average roughness Rz of random unevenness on the interface between the transparent substrate 1 and each color filter 2 a maximum value or more among the value R with m=0 where two or more kinds of color filters fulfill the Formula (G). For example, when three kinds of color filters are used, three kinds of R's are obtained, and an average of roughness height of random unevenness on the interface between all the kind of color filters 2 and transparent substrates 1 is made more than or equal to a maximum R among the three kinds of R's in common.

Up to now, the dispersion of the film thickness of a color filter within a display area, and light in a vertical direction to the transparent substrate 1 has been considered as the angle of transmitted light. On the other hand, a thickness of a color filter which light transmits also differs at an angle of looking at a display area. For that reason, view angle dependence of brightness arises. In the case of using two or more kinds of color filters, it causes dependence on not only brightness but also view angle of color. In order to improve this problem, it can be solved by providing random unevenness, which fulfills Formula (G), in an interface between the transparent substrate 1 and color filter by the same principle as having stated up to now.

Random unevenness of the interface between the transparent substrate 1 and color filter 2 can be formed with roughening a surface of the transparent substrate 1. For example, there are a sand blasting method, a wet etching method by a hydrofluoric acid, or the like, a dry etching method by a reactive gas, a method of applying a silica particle film, and the like.

An upper limit of roughness of the unevenness is determined by some factors. For example, the roughness of the unevenness is given restriction in a forming method of the unevenness in many cases. In addition, extremely increasing roughness of the unevenness, and thickening the actual film thickness at the low portion compared with the intended film thickness D, causes reduction of a light transmittance of the color filter. In addition, when the unevenness becomes large, an influence of the interference becomes small gradually and irregular reflection becomes dominant. This can also cause reduction of the light transmittance. In addition, when the thickness of the transparent substrate itself is thin and unevenness is large, strength of the transparent substrate is weakened. From these points, practically, it is preferable that the upper limit of the ten-point average roughness of unevenness is 10 μm, and it is still more preferable that it is 5 μm or less.

In particular, since the sand blasting method can obtain desired roughness by controlling a blast condition, and does not use a hydrofluoric acid, a reactive gas, and the like, it is preferable at the point of being safe and environment-friendly.

Next, the case where a phosphor is used as a source of luminescence will be described using FIG. 3.

A phosphor 3 is made of, for example, a large number of fluorescent substance particles at particle diameters of 1 μm to ten μm or so (20 μm or less) which emit light by electron beam exciting, and in particular, a P22 phosphor whose parent bodies are zinc sulfide and yttrium oxide is preferable at the point of having good color purity as three primary colors of a display apparatus and having suitable emitting properties. The phosphor 3 can be formed by the photolithography method, screen printing, or the like. Since the phosphor 3 includes many fluorescent substance particles, it can be also paraphrased as a phosphor layer 3.

The phosphor 3 is formed on the color filter 2. The color filter 2, which makes only a necessary wavelength zone transmit efficiently, is arranged according to an emission color of the phosphor 3 out of an emission spectrum of the phosphor 3. The film thickness of the phosphor 3 is determined from brightness and luminous efficiency, and is specifically preferable to be several μm to several tens μm.

Figure 3:
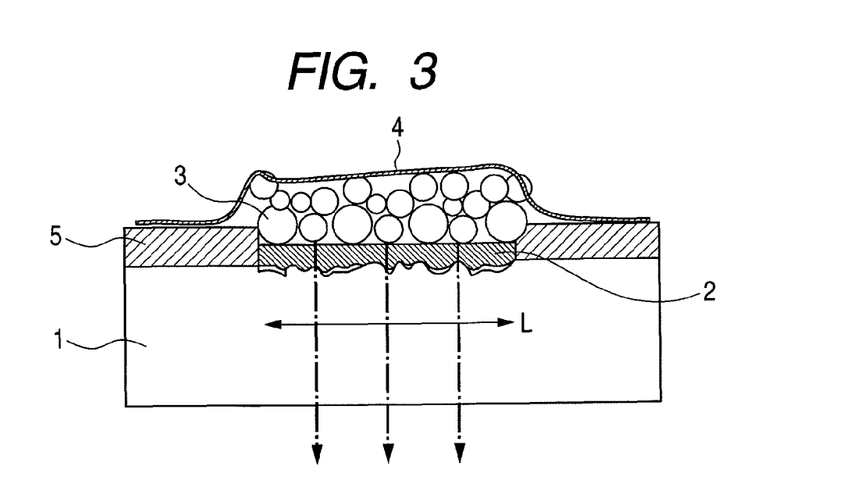
FIG. 3 is a schematic sectional view of the screen structure of the first example of the present invention.

FIG. 3 is a schematic sectional view of the screen structure of the present invention which is more detailed than FIG. 1. The screen structure illustrated in FIG. 3 includes the transparent substrate 1, color filter 2, phosphor 3, a metal back 4, and a black matrix 5 which is a light shielding layer. The color filter 2 and phosphor 3 are stacked in an aperture region, which is delimited by the black matrix 5 which is provided on the transparent substrate 1, and which has an aperture, in this order, and the metal back 4 is formed so as to cover the phosphor 3 and black matrix 5. Hence, it can be said that a region where the interface between the transparent substrate 1 and color filter 2 exists continuously, that is, one pixel region is an aperture region delimited by the black matrix 5.

It is preferable that the black matrix 5 which is a light shielding layer for example, has good black density and sharp clearness of a pattern. The black matrix 5 can be formed usually by the photolithography method or the like using a photosensitive black pigment paste or the like.

The metal back 4 exists for reflecting luminescence of the phosphor 3 to the front, and for example, it is an aluminum film in tens to hundreds nm of film thickness. The metal back 4 can be formed as a film by an evaporation method or a sputtering method on a resin intermediate layer by filming process well-known in a Braun tube field, and can be formed by baking a resin component.

Random unevenness is provided in a surface (interface between the transparent substrate 1 and color filter 2) of a region of the transparent substrate 1 in which the color filter 2 is provided. Once, unevenness of a surface of the transparent substrate 1 is formed throughout the surface of the transparent substrate 1, color irregularity and view angle dependence of color are improved. Nevertheless, unevenness of the surface of the transparent substrate 1 is preferable to be only in a portion of the color filter 2, and it is preferable that a portion of the black matrix 5 is not roughened. The reason is because ambient light (light from outside of the display apparatus) may cause diffuse reflection to degrade bright place contrast if the interface between the black matrix 5 and transparent substrate 1 is roughened. In addition, when the black matrix 5 is formed to the transparent substrate 1 whose surface is roughened, clearness of its pattern may be poor and image quality may become coarse.

Then, after forming the black matrix 5, a surface of the transparent substrate 1 (located in an aperture of a light shielding layer) which is not covered by the black matrix is roughened by sand blasting or the like using the black matrix 5 as a mask thereby, the interface between the black matrix 5 and transparent substrate 1 is not rough, and a sharp black matrix 5 with little diffuse reflection can be obtained.

Figure 4:
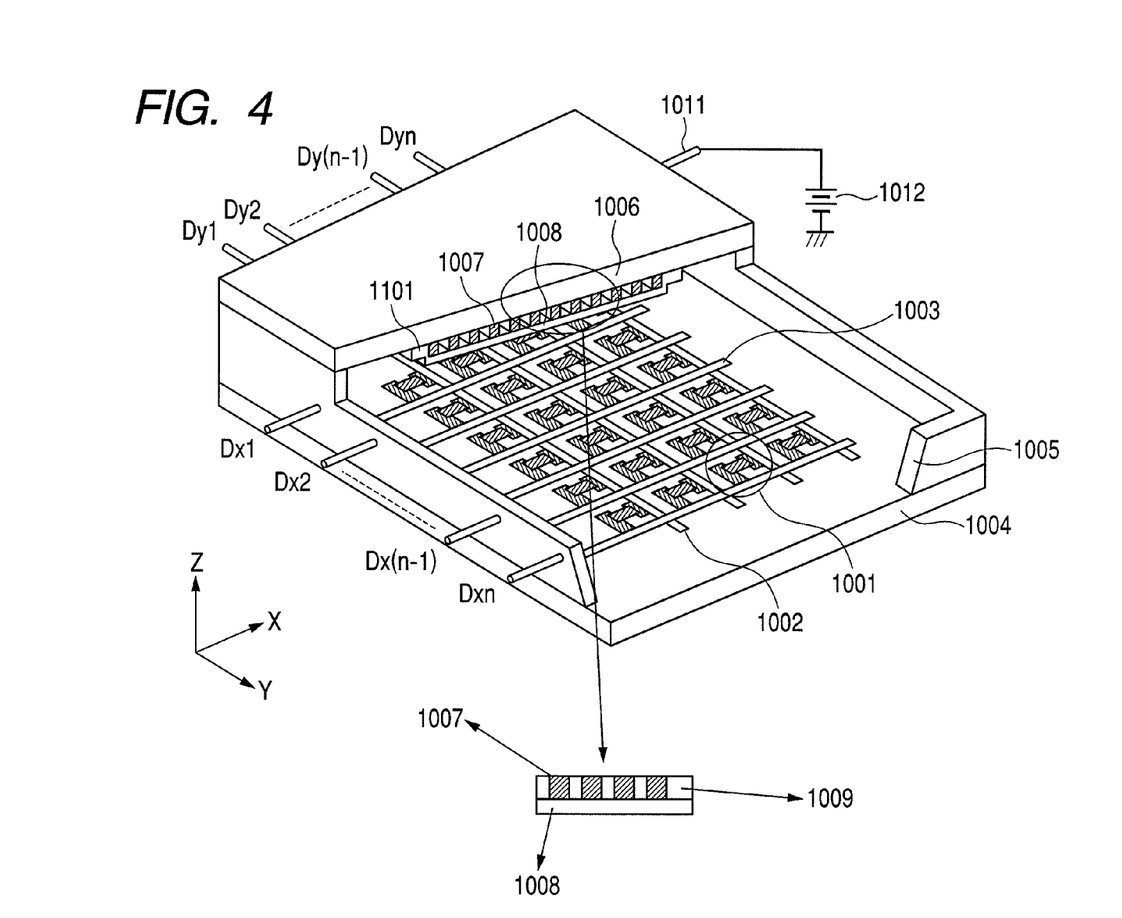
FIG. 4 is a schematic perspective view of a display panel using the screen structure of the first example of the present invention.

FIG. 4 is a perspective view of a display panel, using surface conductive type emission elements, on whose display area an image is displayed by an input of an image signal using the screen structure of the present invention.

The display panel includes a face plate 1006, a rear plate 1004, and a side wall 1005. The side wall 1005 has a high-voltage terminal 1011 connected to a high voltage power supply 1012, terminals Dx1 to Dxn and terminals Dy1 to Dyn. The terminals Dx1 to Dxn are connected to a column-directional wiring 1002 mentioned later, and the terminals Dy1 to Dyn are connected to a row-directional wiring 1003 mentioned later.

The face plate 1006 includes the screen structure (the transparent substrate 1 and color filter 2) of the present invention, a black matrix 1007, a metal back 1008, and a phosphor 1009.

The rear plate includes the transparent substrate, row-directional wiring 1003, column-directional wiring 1002, and surface conductive type emission elements 1001. The row-directional wiring 1003 and column-directional wiring 1002 are arranged on the substrate so as to be orthogonal in the state of being insulated mutually through an insulating film (not illustrated), and surface conductive type emission elements 1001 are arranged at intersections of the row-directional wiring 1003 and column-directional wiring 1002. As for each of the surface conductive type emission elements 1001, one terminal is connected to the row-directional wiring 1003, and another end is connected to the column-directional wiring 1002.

The display panel needs to be an airtight container using the face plate 1006, rear plate 1004, and side wall 1005 and an interior of the display panel.

For example, frit glass is applied to a junction of the side wall 1005, and seal bonding can be achieved by baking for 10 minutes or more at 400 to 500° C. in an air ambient atmosphere or a nitrogen ambient atmosphere. In order to exhaust the interior of the airtight container to a vacuum, after assembling the airtight container, an exhaust pipe and a vacuum pump which are not illustrated are connected, and the interior of the airtight container is exhausted to a degree of vacuum of about $1.33 \times 10^{-5}$ (Pa). After that, although the exhaust pipe is sealed, a getter film (not illustrated) is formed in a predetermined position in the airtight container just before sealing or after sealing in order to maintain the degree of vacuum in the airtight container. The getter film can be formed from a getter material, whose main component is, for example, Ba, by a heater or high frequency induction heating and performing vapor-deposition. It is possible to maintain the interior of the airtight container in the degree of vacuum of $1.33 \times 10^{-3}$ Pa to $1.33 \times 10^{-5}$ Pa by an adsorbing action of the getter film by providing the getter film in the tight container.

As mentioned above, the basic construction and production method of the display panel of the embodiment of the present invention are described.

EXAMPLES

The present invention will be explained below in detail with citing specific examples.

Example 1

This example is an example of the screen structure illustrated in FIGS. 2 and 3.

A glass substrate (PD-200 (made by Asahi Glass Co., Ltd.)) with 2.8 mm thickness was used for the transparent substrate 1. After washing and drying the transparent substrate 1, a photosensitive black pigment paste (in this example, a ruthenium oxide content photosensitive paste) including glass frit and a black pigment was used as a black matrix, and was applied on a entire substrate surface with a thickness of 5 μm by the screen printing method and was dried. After that, in order that it might become a predetermined aperture pattern that the glass substrate is exposed by each opening, exposure and developing were performed, the pattern was baked at 540° C., and the black matrix pattern was formed. At this time, a form of each aperture is a longwise octagon and a width in a longitudinal direction was made to be 320 μm and a width in a cross direction was made to be 155 μm.

Next, abrasive blasting was performed to the glass substrate surface with the formed black matrix with adjusting an abrasive and an injection pressure so as to become desired roughness using a sandblast machine. The desired roughness means roughness in the range of Formula (G). In this example, optical interference in a color filter is caused most easily in a red whose wavelength is long and whose light-emitting wavelength is a base line spectrum. Then, each parameter for performing calculation on the basis of a refractive index of a red color filter and a light-emitting wavelength of a red fluorescent substance was measured, and calculated. A refractive index of ferric oxide (red ocher) used as the red color filter this time was 2.8 as a result of measurement with an Abbe refractometer. In addition, a refractive index of the glass substrate was 1.5. A film thickness of the color filter was made to be 1.5 μm in consideration of brightness and contrast. In addition, when measuring the light-emitting wavelength of a red fluorescent substance $Y_2O_2S$:Eu with a spectrocolorimetry meter, the wavelength was a base line spectrum and a peak wavelength was 627 nm. As a result of applying such numerical values to Formula (D) and performing calculation as m=0, it was R=0.24 μm, and it was R'=0.48 μm as a result of applying them to Formula (F) and performing calculation as m'=0. Hence, according to Formula (G), 0.24 μm or more of ten-point average roughness (Rz) was necessary for the surface of the glass substrate.

In the case of providing two or more kinds of color filters on the transparent substrate 1, in this way, it is preferable to apply light with a longest wavelength (in this case, a dominant wavelength among light-emitting wavelengths of the red fluorescent substance) to λp in Formula (G), and to determine surface roughness. Then, it is preferable to apply the surface roughness determined in this way to the surface of the transparent substrate located in all the apertures of the black matrix (light shielding layer). In addition, in detail, although λp in Formula (G) is a dominant wavelength of light which transmits the color filter among the wavelengths of the light from the source of luminescence, in particular, when the source of luminescence is a phosphor, it can be regarded simply that it is a dominant wavelength among the wavelengths of the light from the source of luminescence.

As blast conditions for making the surface of the glass transparent substrates 1 more than the calculated roughness, an abrasive with 350 HV of hardness and 9 g/cm$^3$ of specific gravity was used and processing was performed in 0.05 MPa of injection pressure. In consequence, when performing measurement with making a reference length L as 0.25 mm in a longitudinal direction of a center portion of an aperture, the ten-point average roughness Rz of the surface of the glass substrate which became an interface with the color filter was about 2.2 μm, and the surface roughness more than the desired roughness expressed in Formula (G) was obtained. In addition, the surface roughness more than the roughness expressed in Formula (H) was also obtained simultaneously.

Next, the color filter 2 was applied by screen printing. In this embodiment, ink in which a red (red ocher), blue (cobalt blue), or green (cobalt green) pigment is dispersed with a particle diameter of 0.05 to 0.5 μm was used as a color filter material used in the field of CRT. First, pattern printing was performed from the green by screen printing and it was dried. After that, printing and drying were repeated in the order of the blue and red, and predetermined colors were applied to predetermined positions. A thickness of the color filter 2 was controlled with concentration of each pigment, and a mesh opening area of a screen plate, and a red film thickness was made to be about 1.5 μm, a blue film thickness about 3 μm, and a green film thickness about 1.5 μm.

Next, the phosphor 3 was applied by screen printing similarly to the color filter. As the phosphor used in this embodiment, the commercially available phosphor P22 used in the field of CRT was used. P22-RE3 ($Y_2O_2S$:Eu3+) was used as the red, P22-B2 (ZnS: Ag, Al) was done as the blue, and P22-GN4 (ZnS: Cu, Al) was used as the green. The phosphor having a mean particle diameter of 6 μm in a median diameter Dm was used. The pastes in which such phosphor powder was dispersed in a vehicle were pattern-printed first from the green by the screen printing and was dried. After that, printing and drying were repeated in the order of the blue and red, and predetermined colors were applied to predetermined positions, and it was baked at 450° C. after that.

A thickness of the phosphor 3 was controlled by a phosphor concentration in the vehicle and a mesh aperture rate of a screen plate, and three colors were also made at about 15 μm.

Next, a resin interlayer was prepared by a filming process well known in the field of CRT, and an Al film was formed as a film on an upper portion thereof by an EB evaporation method. Finally, by performing thermal decomposition removal of the resin interlayer, the 100-nm-thick metal back 4 was formed as illustrated in FIG. 3.

In the face plate of the electron ray display apparatus prepared as described above and illustrated in FIG. 3, the optical interference due to reflected light on top and bottom interfaces of a color filter layer was avoided, and color irregularity and view angle dependence of color were improved.

Example 2

Figure 5:
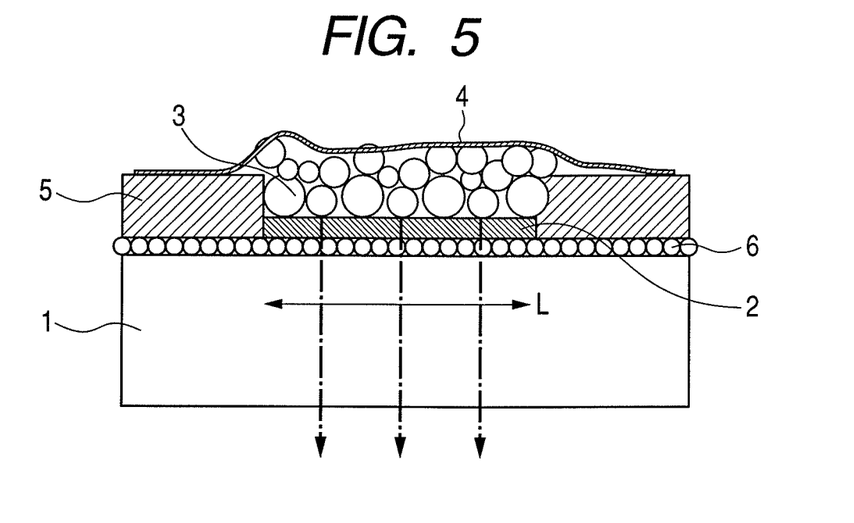
FIG. 5 is a schematic sectional view of a screen structure illustrated in the second example of the present invention.

This example is an example of a screen structure illustrated in FIG. 5.

For the transparent substrates 1 made of glass as same as that in the first example, a silica-fine-particle-contained water solution (made by NISSAN CHEMICAL Industries, Ltd., SNOWTEX) was applied to an image display unit by a spray coater and was dried, and a fine particle silica layer 6 was formed. Surface roughness of the glass transparent substrates 1 after drying was controlled with a particle diameter of a silica particle, a concentration in the solution, and a spraying amount, and is made into the range expressed by Formula (D). That is, the ten-point average roughness Rz of the surface of the fine particle silica layer 6 was about 3.0 µm with letting the reference length L be 0.8 mm.

Next, pattern printing of the black matrix 5 was performed to a black matrix pattern, which was grid-like and was around the display unit, by screen printing, and drying and baking were performed.

After that, the process after color filter 2 in the first example was used for manufacture in the similar way.

As for the screen structure which was manufactured as described above and is illustrated in FIG. 5, although bright place contrast deteriorates slightly because of increase in diffuse reflection in the interface between the black matrix 5 and glass substrate 1, the color irregularity and view angle dependence of color was improved similarly to the first example.

Comparative Example

On the other hand, a screen structure similar to that of the first example except a point that an interface between a color filter and a transparent substrate was even was manufactured in the similar way. Surface roughness Rz of the glass transparent substrate (PD-200) which was not given the sand blasting was out of the range of Formula (D). Color irregularity was confirmed in a screen of an image display apparatus manufactured using this face plate. In addition, depending on an angle seen, some difference in hue was found. These are considered to have been caused by a film thickness distribution of the color filter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-296577, filed Nov. 15, 2007, and 2008-279723, filed Oct. 30, 2008, which are hereby incorporated by reference herein in their entirety.

What is claimed is:

1. A screen structure which has a transparent substrate and a color filter on the transparent substrate, wherein the color filter has a plurality of regions, and the substrate has a height difference with a value R expressed in the following Formula 1 in an interface with the color filter inside each of the regions:

$$R=(m+\tfrac{1}{2})\lambda p/|Ncf-Ng| \quad \text{Formula 1}$$

where, m denotes a natural number including zero, $\lambda p$ denotes a dominant wavelength of light, which transmits the color filter, Ncf denotes a refractive index of the color filter, and Ng denotes a refractive index of the transparent substrate.

2. A screen structure which has a transparent substrate and a color filter on the transparent substrate, wherein the transparent substrate has unevenness in an interface with the color filter over almost an entire area where the transparent substrate forms the interface with the color filter, and a ten-point average roughness of the unevenness, with letting a reference length be 0.8 mm or less, is larger than or equal to a value Rz expressed by the following Formula 2:

$$Rz=\lambda p/2|Ncf-Ng| \quad \text{Formula 2}$$

where, $\lambda p$ denotes a dominant wavelength of light, which transmits the color filter, Ncf denotes a refractive index of the color filter, and Ng denotes a refractive index of the transparent substrate.

3. The screen structure according to claim 2, wherein the ten-point average roughness of the unevenness is not less than a value Rz' expressed by the following Formula 3:

$$Rz'=\lambda p/|Ncf-Ng| \quad \text{Formula 3.}$$

4. The screen structure according to claim 2, wherein the ten-point average roughness of the unevenness is larger than a ten-point average roughness of a surface of the color filter.

5. The screen structure according to claim 2, wherein the screen structure has two or more kinds of color filters which have different dominant wavelengths of light to transmit them, and the ten-point average roughness of the unevenness of an interface between the transparent substrate and each of the two or more kinds of color filters is not less than a maximum value of a plurality of values Rz expressed by the Formula 2.

6. The screen structure according to claim 5, wherein a dominant wavelength of light which transmits a kind of color filter which becomes the maximum value is a wavelength of a red.

7. The screen structure according to claim 2, comprising:
a light shielding layer which has a plurality of apertures on the transparent substrate; and
the color filter on the transparent substrate exposed by the plurality of apertures.

8. The screen structure according to claim 7, wherein a reference length of the ten-point average roughness of the unevenness is not more than each width of the plurality of apertures.

9. The screen structure according to claim 7, wherein the transparent substrate has the unevenness only in regions exposed by the plurality of the apertures.

10. A method of manufacturing the screen structure according to claim 9, comprising:
a step of providing the light shielding layer which has a plurality of apertures on the surface of the transparent substrate, and thereafter, providing the unevenness on the surface of the transparent substrate, exposed by the plurality of apertures, by using the light shielding layer as a mask; and
a step of providing the color filter on the surface of the transparent substrate on which the unevenness is provided.

11. A display panel, comprising the screen structure according to claim 2 and a source of luminescence.

12. The display panel according to claim 11, wherein the source of luminescence is a phosphor.

13. The display panel according to claim 12, comprising:
the phosphor on the color filter of the screen structure; and
an electron-emitting device on a substrate, wherein the screen structure and the substrate are arranged facing each other.

14. Electronic equipment, comprising the display panel according to claim 11.

* * * * *